US012546164B2

(12) United States Patent
Meng

(10) Patent No.: US 12,546,164 B2
(45) Date of Patent: Feb. 10, 2026

(54) LADDER WITH IMPROVED SAFETY STRUCTURES

(71) Applicant: iGas Inc, Tampa, FL (US)

(72) Inventor: Peter Yuanbao Meng, Tampa, FL (US)

(73) Assignee: iGas Inc, Tampa, FL (US)

( * ) Notice: Subject to any disclaimer, the term of this patent is extended or adjusted under 35 U.S.C. 154(b) by 423 days.

(21) Appl. No.: 18/129,541

(22) Filed: Mar. 31, 2023

(65) Prior Publication Data

US 2024/0328254 A1 Oct. 3, 2024

(51) Int. Cl.
*E06C 1/20* (2006.01)
*E06C 7/48* (2006.01)

(52) U.S. Cl.
CPC . *E06C 1/20* (2013.01); *E06C 7/48* (2013.01)

(58) Field of Classification Search
CPC . E06C 7/48; E06C 7/482; E06C 7/484; E06C 7/486; E06C 7/488; E06C 7/50; E06C 7/505; E06C 9/06; E06C 9/12; E06C 5/35; E04G 5/046
See application file for complete search history.

(56) References Cited

U.S. PATENT DOCUMENTS

| | | | | | |
|---|---|---|---|---|---|
| 2,680,554 | A * | 6/1954 | Dakin | E06C 7/48 | 182/120 |
| 3,288,249 | A * | 11/1966 | Gibson | E06C 7/48 | 182/214 |
| 3,459,277 | A * | 8/1969 | Frederick | E06C 7/48 | 248/235 |
| 4,121,692 | A * | 10/1978 | Morawski | E06C 7/16 | 182/129 |
| 4,331,217 | A * | 5/1982 | Stecklow | E06C 7/16 | 248/238 |
| 4,754,842 | A * | 7/1988 | Southern | E06C 7/48 | 182/214 |
| 5,165,501 | A * | 11/1992 | Donahey | E06C 7/423 | 182/214 |
| 6,152,262 | A * | 11/2000 | Jung | E06C 7/48 | 182/172 |
| 6,244,382 | B1 * | 6/2001 | Labonte | E06C 7/48 | 182/214 |

(Continued)

FOREIGN PATENT DOCUMENTS

| | | | | |
|---|---|---|---|---|
| FR | 2699221 A1 * | 6/1994 | B44C 7/02 |
| GB | 2279102 A * | 12/1994 | E06C 7/482 |

*Primary Examiner* — Joshua J Michener
(74) *Attorney, Agent, or Firm* — Andrew Behrens; Trenam Law

(57) ABSTRACT

A ladder including a ladder body and a positioning structure. The positioning structure is connected at the top of the ladder body and comprises a positioning connecting rod a pair of positioning legs. The positioning connecting rod is connected to the main body of the ladder and the positioning legs are connected to both ends of the positioning connecting rod. The positioning legs may include positioning links and a positioning plate. The positioning links are connected between the positioning connecting rod and the positioning plate. The positioning plate is used to secure the ladder body to a surface. When in use, the top of the ladder body can be fixed at a high place by the positioning structure. In fixing one end, the entire is more secure thereby improving the safety during use.

16 Claims, 10 Drawing Sheets

(56) References Cited

U.S. PATENT DOCUMENTS

| | | | | |
|---|---|---|---|---|
| 6,250,424 | B1 * | 6/2001 | Laug | E06C 7/48 182/214 |
| 6,681,893 | B1 * | 1/2004 | Coulson | E06C 7/48 182/214 |
| 8,251,180 | B1 * | 8/2012 | Paige | E06C 7/48 182/214 |
| 10,619,416 | B1 * | 4/2020 | Snell | E06C 7/06 |
| 2005/0126855 | A1 * | 6/2005 | Tilley | E06C 7/48 182/107 |
| 2005/0139425 | A1 * | 6/2005 | Thomas | E06C 1/34 182/214 |
| 2009/0255759 | A1 * | 10/2009 | Barnes | E06C 7/48 182/204 |
| 2015/0337596 | A1 * | 11/2015 | Cherevko | E06C 1/06 29/428 |
| 2017/0058604 | A1 * | 3/2017 | Minette | E06C 7/48 |

* cited by examiner

LADDER WITH IMPROVED SAFETY STRUCTURES

BACKGROUND OF THE INVENTION

1. Field of the Invention

This invention relates, generally, to ladders.

2. Brief Description of the Prior Art

As a daily life and production tool, ladders are widely used in construction, installation, fire protection, household and other fields. The ladder is flanked by two elongated support members with multiple crossbars connecting the elongated support members to allow for climbing.

There are several types of ladders, generally including straight ladders, herringbone ladders, telescopic ladders, etc. The straight ladder is the simplest ladder, consisting of only two elongated support members and multiple crossbars; herringbone ladders are equivalent to two sets of straight ladders, which are in the shape of "human" when used; telescopic ladders can be telescopic in height; and straight ladders and herringbone ladders can be made into telescopic ladders. Each ladder has its own advantages and disadvantages. A straight ladder has a simple structure and is cheap. A herringbone ladder is stable to use and relatively safe. A telescopic ladder can be contracted to reduce its footprint and allow for more convenient storage.

Taking the straight ladder as an example, during use, the top part is in contact with the high wall or objects and the bottom is in contact with the ground. Therefore, in the process of use, the ladder is susceptible to unwanted movement, sliding, or even dumping, causing potential safety hazards. As a result, it is often necessary for someone to support the straight ladder to ensure the safety of use.

Accordingly, what is needed is an improved ladder design that is safer to use. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved ladder design is now met by a new, useful, and nonobvious invention.

The novel structure includes a ladder comprising a main body and a positioning structure. The main body could be a straight ladder or telescopic ladder.

The positioning structure is connected at the top of the main body and comprises a positioning connecting rod and a pair of positioning legs. The positioning connecting rod is connected with the main body and the positioning legs are connected to the two ends of the positioning connecting rod, respectively, Each positioning leg includes a positioning link and a positioning plate. The positioning link is connected between the positioning connecting rod and the positioning plate, and the positioning plate is used to fix with the support.

The positioning link may comprise a fixed rod and a pair of rotating rods. One end of the fixed rod is connected with one end of the positioning connecting rod. One end of the pair of rotating rods is rotatably connected with the other end of the fixed rod, and the other end of a pair of rotating rods is connected with the positioning plate. The pair of rotating rods can be rotatably connected with the positioning plate.

The positioning plate may be located in an area between a pair of rotating rods. Further, the other end of the fixed rod and one end of the pair of rotating rods may be rotatably connected by a rotating connector.

The connection of the positioning connecting rod with the fixed rod may include a reinforcing block. In addition, the fixing rod can be perpendicular to the positioning connecting rod. In some embodiments, the positioning connecting rod extends along the width direction of the main body. In some embodiments, the positioning connecting rods are connected to the crossbars.

In some embodiments, the positioning plate comprises a plate body and at least one rotating plate. The positioning link is connected to the plate body and the rotating plate may be rotatably connected to at least one end of the plate body. In some embodiments, the positioning plate also includes a spacer on a surface of the positioning plate that is opposite to the surface to which the positioning linkage is attached.

In some embodiments, the ladder further comprises a support structure. The support structure comprises support legs that are connected on both sides of the lower part of the main body. Each support leg comprises a first leg and a second leg. One end of the first leg is rotatably connected with the main body and the other end of the first leg is slidably connected to the second leg. In addition, one end of the second leg is rotatably connected with the main body and the other end of the second leg is the support end. The other end of the first leg may slide in the direction of the length of the second leg.

In some embodiments, the support structure further comprises a support connecting rod that is connected between the support legs on both sides. In some embodiments, the support legs are respectively connected to the elongated support members on both sides of the main body.

Due to the application of the above technical solutions, the present invention has the following advantages and effects compared with the prior art: the present invention by setting a positioning structure, when in use, the top of the main body can be fixed at a high place by the positioning structure, and the fixing of one end makes the entire ladder immovable when used, avoiding sliding and tipping and improving the safety of use.

The positioning structure of the present invention can be fixed on a plane, arc, or even a right-angled plane, and has high compatibility with the use environment. In addition, the positioning structure of the present invention is designed to be simple, processing and production are convenient, the cost is low, and the fixing and disassembly during use are very convenient.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
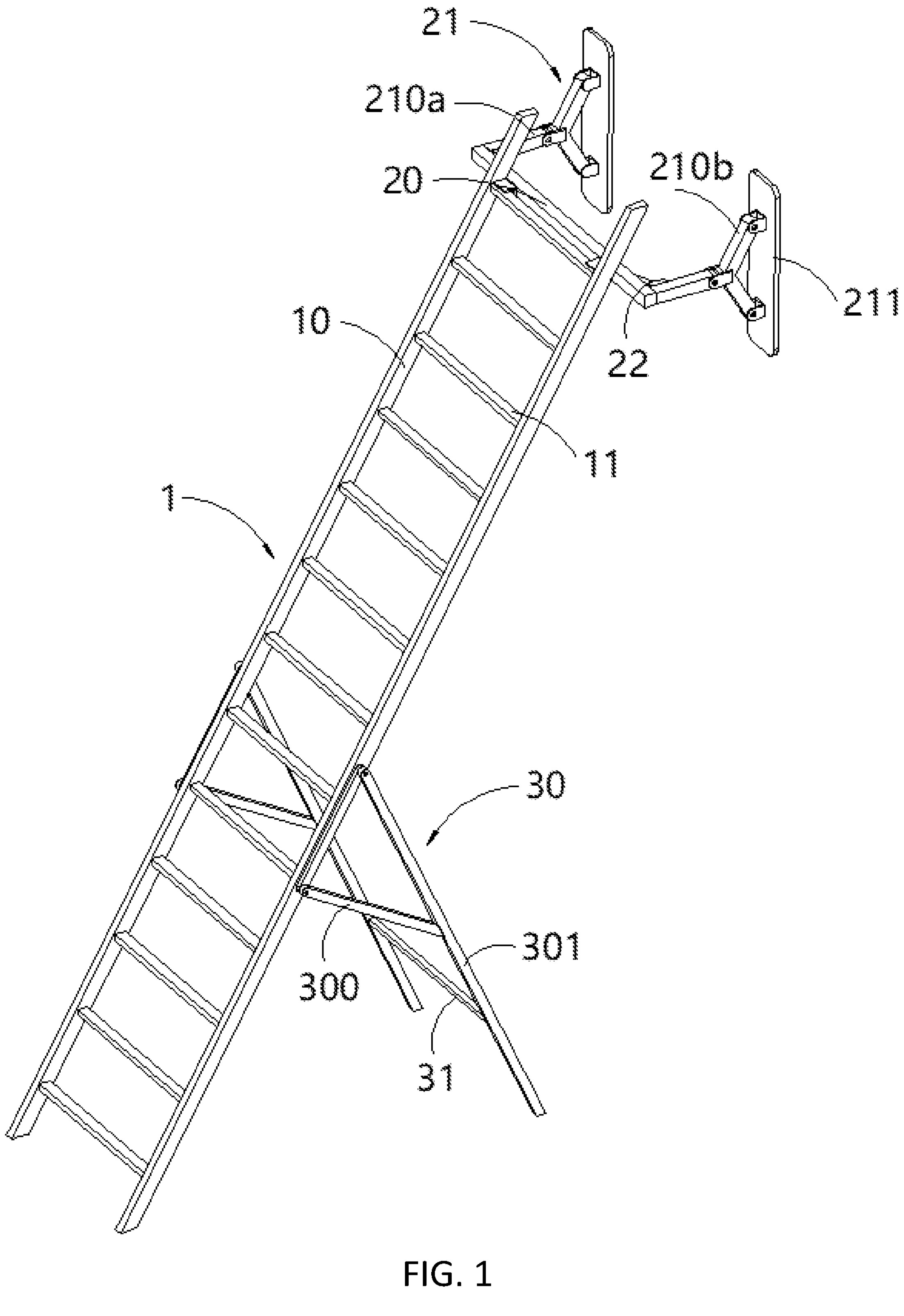
FIG. 1 is a three-dimensional schematic view of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

In the description of the present invention, it should be noted that the terms "center," "up," "down," "left," "right," "vertical," "horizontal," "inside," "outside" and the like indicate the orientation or position relationship based on the orientation or position relationship shown in the drawings, only for the convenience of describing the present invention and simplifying the description, not to indicate or imply that the device or element referred to must have a specific orientation, constructed and operated in a particular orientation, so it cannot be understood as a limitation of the present invention. In addition, the terms "first," "second," "third," etc. are for descriptive purposes only and cannot be understood as indicating or implying relative importance.

An embodiment of the ladder of the present invention is shown in FIG. 1. As depicted, the ladder includes a main body 1, the main body 1 may be a straight ladder, or a telescopic ladder. Whether it is a straight ladder or a telescopic ladder, the main body 1 of the ladder includes elongated support members 10 located on both sides of the ladder with a plurality of crossmembers 11 connected between the elongated support members 10. Each of plurality of crossmembers 11 are distributed along the length of the elongated support members 10, forming steps for climbing.

In some embodiments of the present invention, the ladder further comprises a positioning structure. The positioning structure is connected to the upper end of the main body 1, wherein the upper end refers to the top of the ladder when in an upright state.

The positioning structure includes a positioning connecting rod 20 and at least one positioning leg 21. The positioning connecting rod 20 is connected to the main body 1. In some embodiments, positioning connecting rod 20 is connected with one of the plurality of crossmembers 11 at the top of the main body 1. In some embodiments, the positioning connecting rod 20, when connected to one of the crossmembers 11, extends along the width of the main body 1. The positioning legs 21 are in turn connected to both ends of the positioning rod 20.

Figure 2:
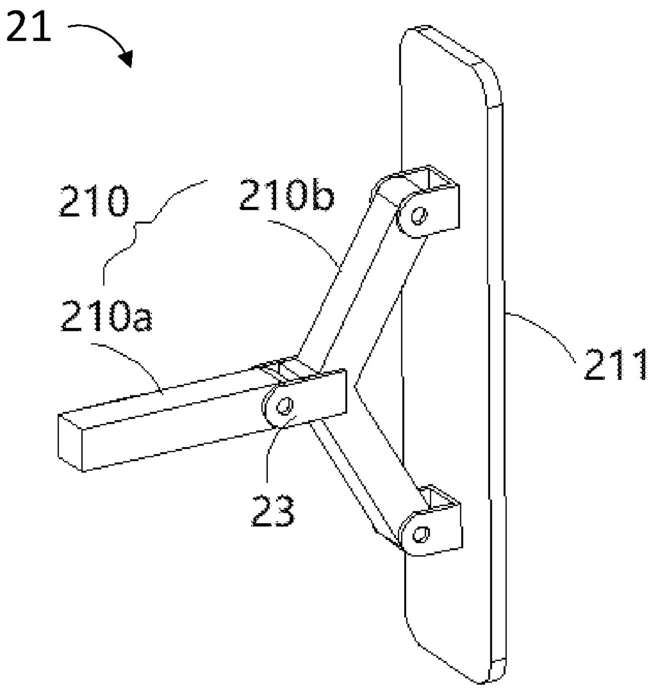
FIG. 2 is a schematic diagram of a structure of an embodiment of the locating legs.
Figure 3:
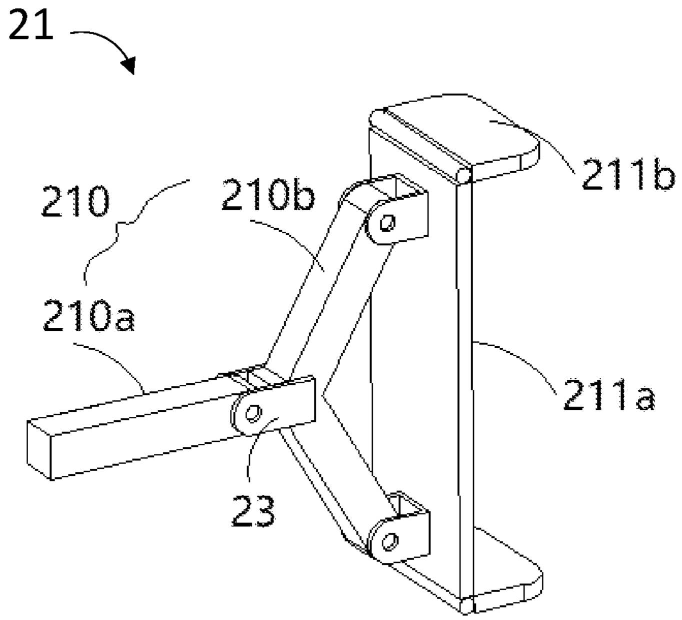
FIG. 3 is another structural schematic diagram of an embodiment of the locating legs.

As best depicted in FIGS. 1-3, the positioning legs 21 each include a positioning link 210 and a positioning plate 211. The positioning link 210 is connected between the positioning connecting rod 20 and the positioning plate 211. The positioning plate 211 is used to help secure the ladder against a surface 5.

In some embodiments, the positioning link 210 includes a fixed rod 210*a* and a pair of rotating rods 210*b*. One end of the fixed rod 210*a* is connected with one end of the positioning connecting rod 20 and the fixed rod 210*a* is perpendicular to the positioning connecting rod 20. Some embodiments include a reinforcing block 22 to secure the fixed rod 210*a* to the positioning connecting rod 20.

A pair of rotating rods 210*b* are rotatably secured to a second end of fixed rod 210*a*. In some embodiments, the pair of rotating rods 210*b* are generally Y-shaped with single free end side of the Y-shape rotatably secured to fixed rod 210*a* via rotating connector 23 and the other two free ends of the Y-shaped rotating rods 210*b* are rotatably connected with the positioning plate 211.

Figure 4:
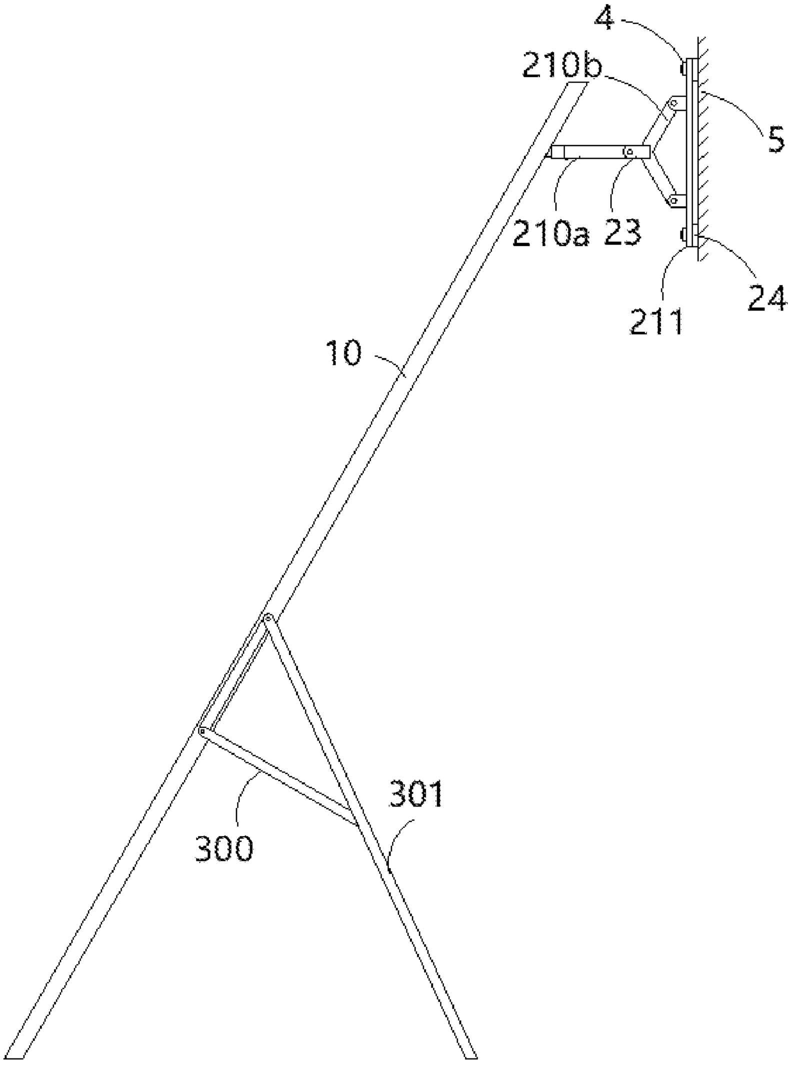
FIG. 4 is a side view of an embodiment of the present invention.

As depicted in FIG. 4, some embodiments include a spacer 24 secured on one side of the positioning plate 211. More specifically, spacer 24 is located on the side of the positioning plate 211 that is opposite to the side of the positioning plate 211 that is secured to the positioning link 210. The spacer 24 may increase the friction between the positioning plate 211 and the surface 5.

The positioning plate 211 has a variety of forms to allow the ladder to more securely rest against surface 5. In one form, as shown in FIG. 2, the positioning plate 211 is a straight plate. However, the positioning plate 211 may be bent according to the shape of the surface 5. In addition, the positioning plate 211 may include fasteners 4 (e.g., a combination of screw, bolt and nut) and fastener receipts to secure the ladder to the surface 5, as exemplified in FIGS. 7-11.

Figure 5:
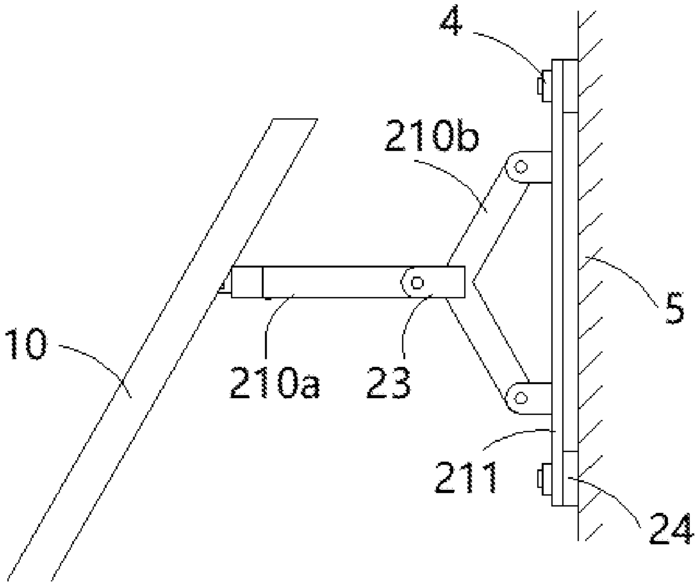
FIG. 5 is a side view of an embodiment of the upper section of the device depicted in FIG. 4.
Figure 6:
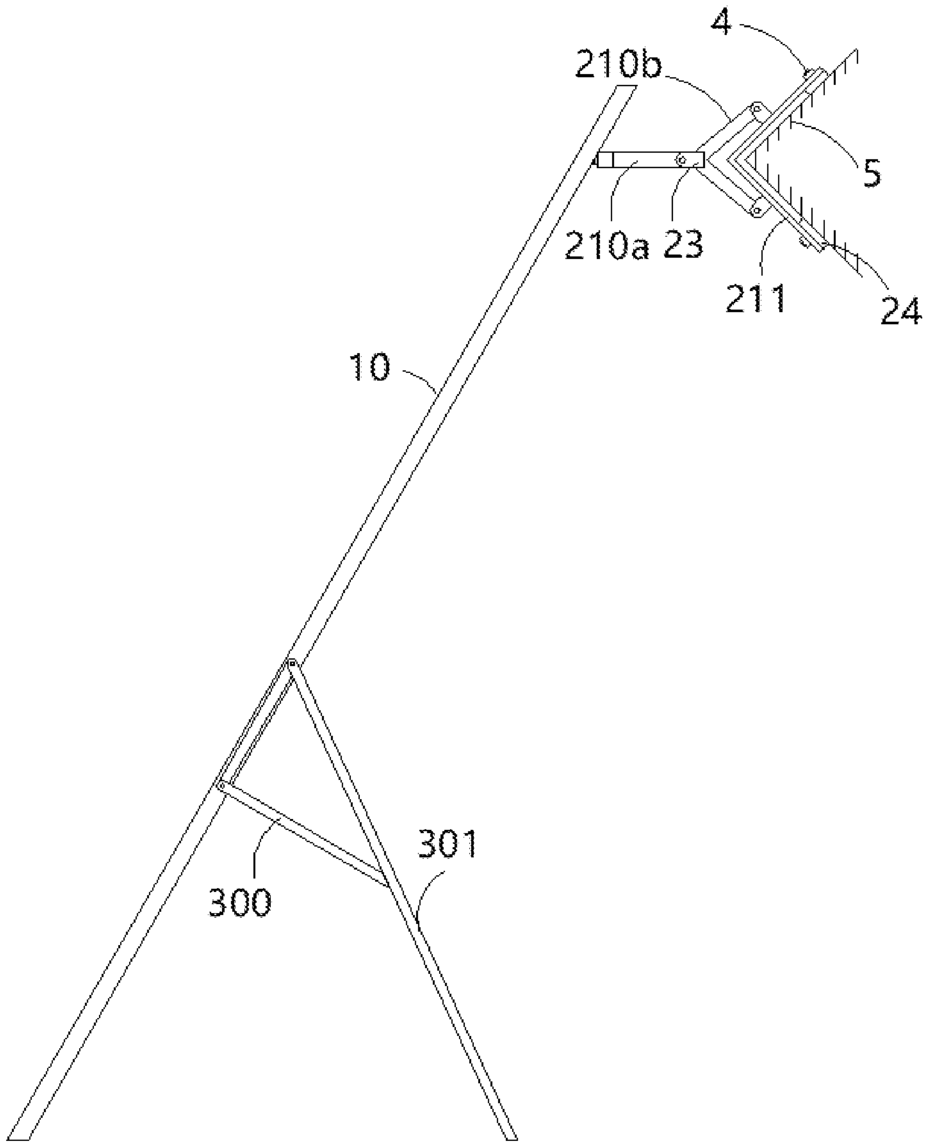
FIG. 6 is a side view of an embodiment of the present invention.
Figure 7:
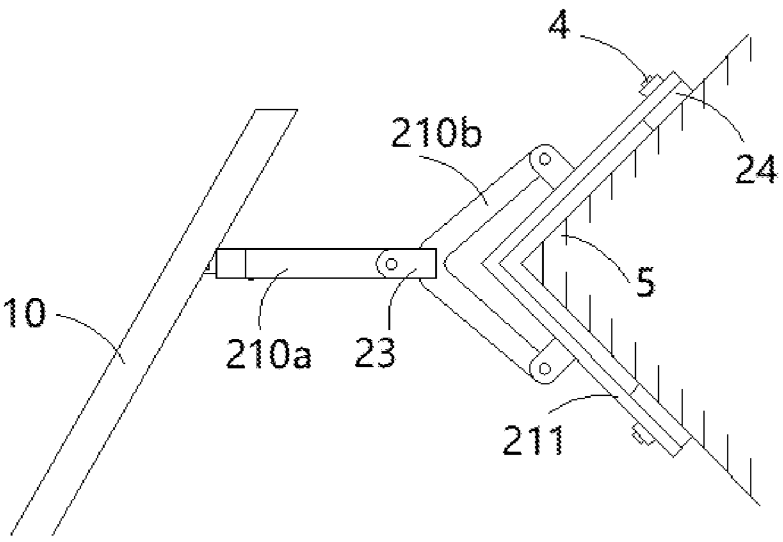
FIG. 7 is a side view of an embodiment of the upper section of the device depicted in FIG. 6.
Figure 8:
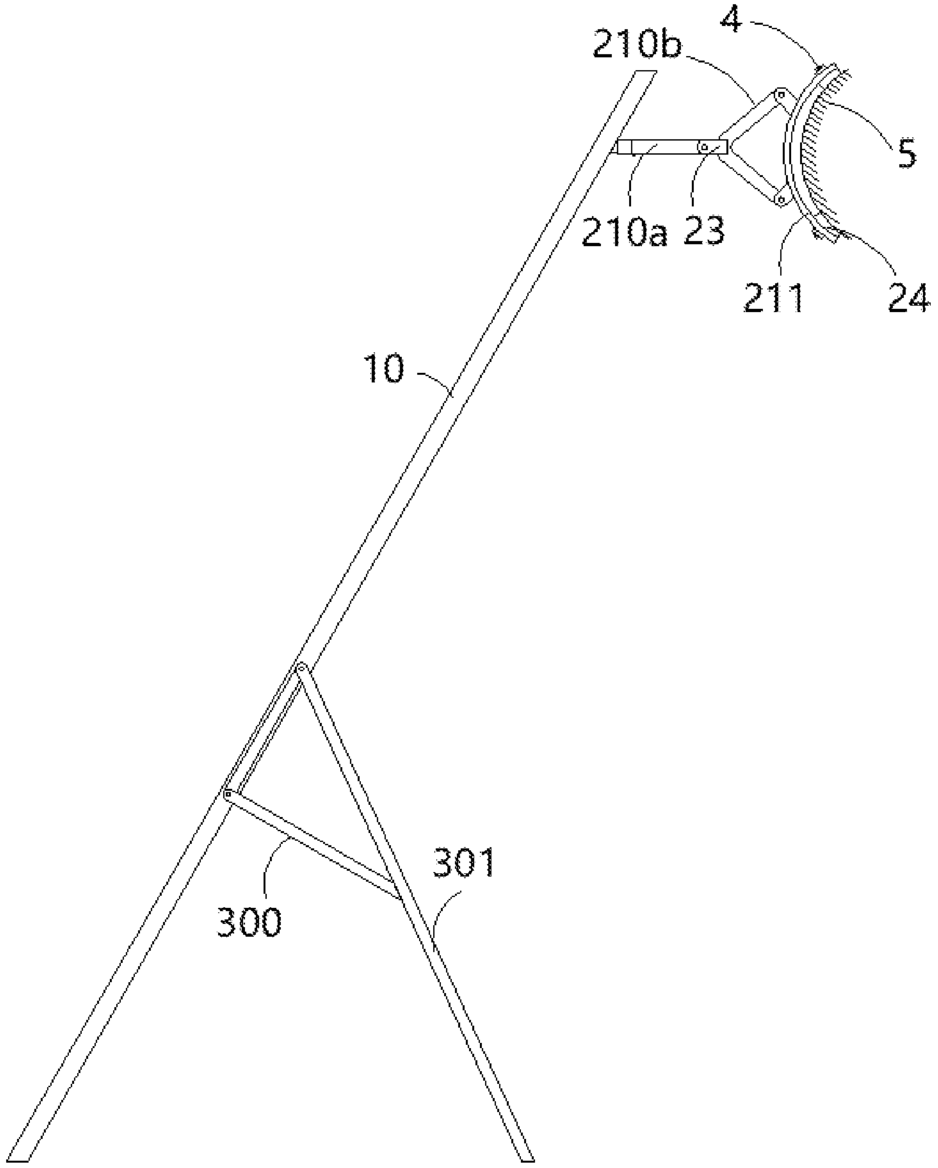
FIG. 8 is a side view of an embodiment of the present invention.
Figure 9:
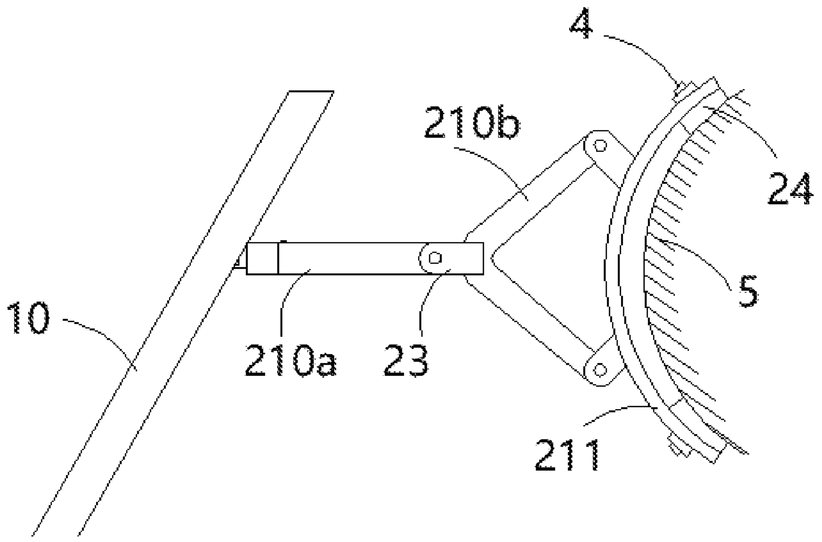
FIG. 9 is a side view of an embodiment of the upper section of the device depicted in FIG. 8.

As shown in FIGS. 4 and 5, the positioning plate 211 can be fixed on the plane by fasteners 4. As shown in FIGS. 6 and 7 the positioning plate 211 can be bent at 90° and fixed on the right-angle surface by fasteners 4. Of course, the angle of bending can depend on the shape of the outer surface of the surface 5. For example, as shown in FIGS. 8 and 9, the positioning plate 211 can be bent in an arc and fixed on the arc surface 5 via fasteners 4. Likewise, the curve of the bending can depend on the shape of the outer surface 5.

In some embodiments, as shown in FIG. 3, the positioning plate 211 includes a plate body 211*a* and one or more rotating plates 211*b*. The pair of rotating rods 210*b* is connected to the plate body 211*a* and the rotating plate 211*b* is rotatably connected to at least one end of the plate body 211*a*. In some embodiments, both ends of the plate body 211*a* are connected to rotating plates 211*b*.

Figure 10:
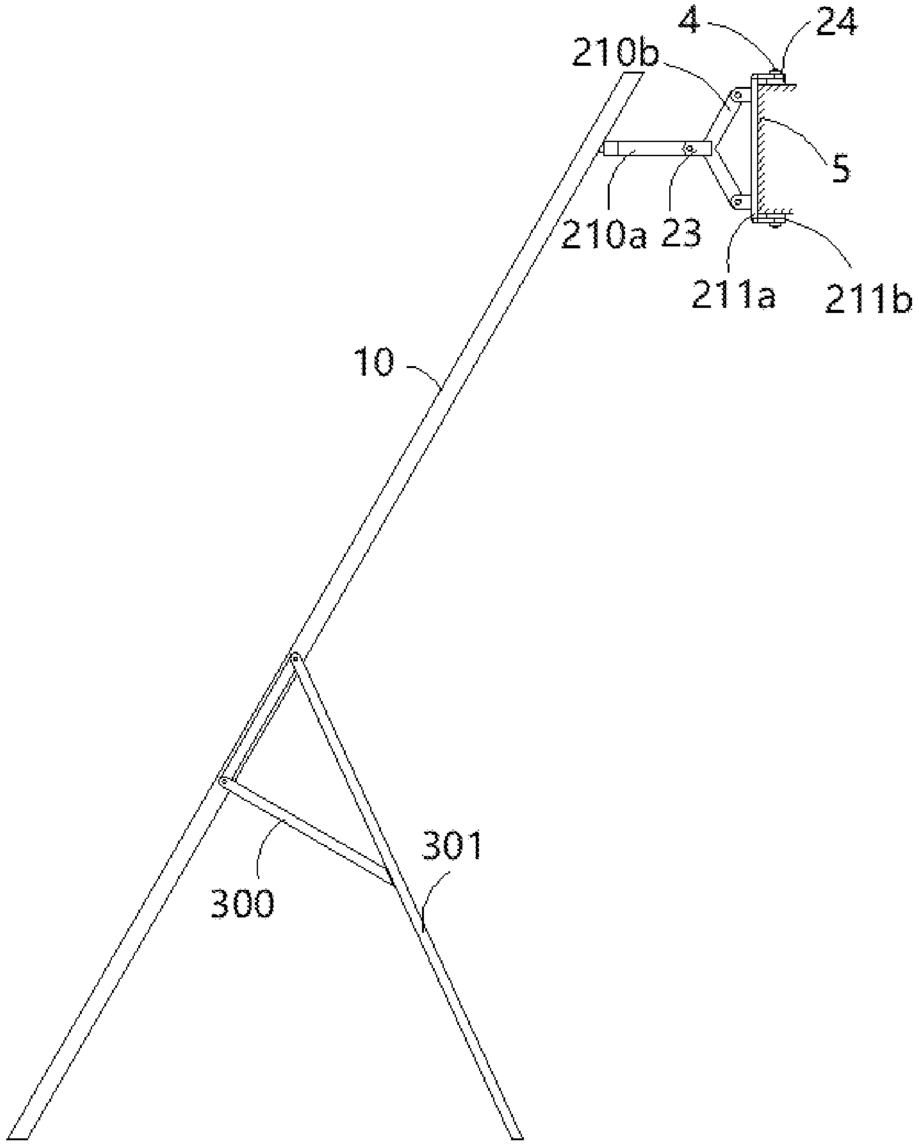
FIG. 10 is a side view of an embodiment of the present invention.
Figure 11:
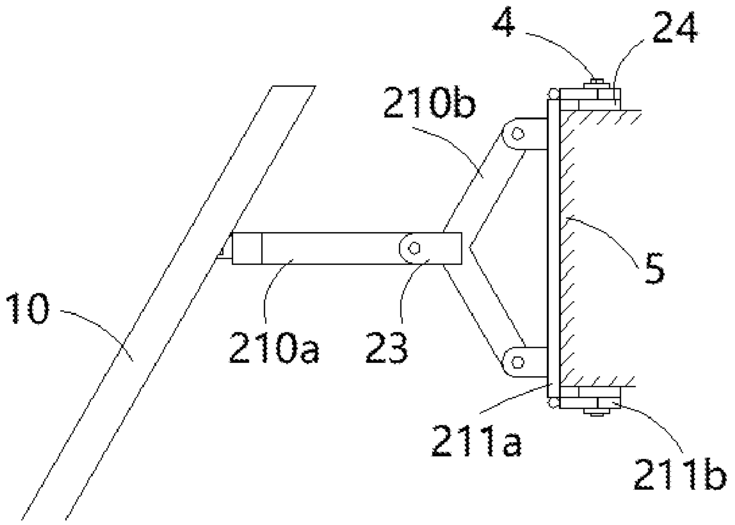
FIG. 11 is a side view of an embodiment of the upper section of the device depicted in FIG. 10.

As shown in FIGS. 10 and 11 an embodiment of the plate body 211*a* and the rotating plate 211*b* are angled with respect to each other at roughly 90°. The rotating plates 211*b* can be fixed on the right-angle surfaces by fasteners 4. Of course, the rotation angle between the plate body 211*a* and the rotating plate 211*b* can be determined by the shape of the surface 5.

Referring back to FIG. 1, some embodiments of the present invention further comprise a support structure. The support structure enhances stability of ladder 1 during the use.

The support structure includes a pair of support legs 30 with a support connecting rod 31 extending between the two support legs 30. Each support leg 30 is connected on one of the lateral sides of a lower portion of the main body 1. The lower portion refers to the lower part of the ladder in an upright state.

Each support leg 30 includes a first leg 300 and a second leg 301. A first end of the first leg 300 is rotatable connected with the main body 1, specifically with the lower part of one of the elongated support members 10 of the main body 1. A second end of the first leg 300 is slidably connected to the second leg 301. Specifically, first leg 300 may slide in the length direction about the second leg 301.

One end of the second leg 301 is rotatably connected with the main body 1, specifically with the lower part of one of the elongated support members 10 of the main body 1. The rotational connection with the elongated support member 10 is higher than the rotational connection between the first leg 300 and the elongated support member 10. The other end of the second leg 301 is the support end that is intended to rest on a ground surface. The support connecting rod 31 is connected between the two second legs 301 between the upper and lower ends of the second legs 301.

Of course, there is another simplified structure of the support structure, that is, the support structure does not include the first leg 300, and only forms a support with the main body 1 through the second leg 301.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A ladder, comprising: a main body extending between and upper end and a lower end, the main body including a pair of elongated support members and a plurality of crossmembers extending therebetween; a positioning structure connected at an upper end of the main body, the positioning structure including: a positioning connecting rod connected to the main body and having two opposing ends; a pair of positioning legs, the positioning legs are respectively connected at the opposing ends of the positioning connecting rod; and each positioning leg including a positioning link and a positioning plate, wherein the positioning link is connected between the positioning connecting rod and the positioning plate; wherein each positioning link comprises: a fixed rod, the fixed rod having a first end connected to the positioning link in a non-rotatable manner; a pair of rotating rods, wherein a first end of each of the pair of rotating rods is rotatably connected to a second end of the fixed rod; a second end of each of the pair of rotating rods connected with its respective positioning plate; and whereby each positioning plate is configured to provide a stable base against a surface.

2. The ladder according to claim 1, wherein second end of each of the pair of rotating rods is rotatably connected with the positioning plate.

3. The ladder according to claim 2, wherein the positioning plate is located in the area between a pair of rotating rods can be bent.

4. The ladder according to claim 1, wherein the fixed rod is rotatably connected to the pair of rotating rods by a rotating connector.

5. The ladder according to claim 1, wherein the connection of the positioning connecting rod and the fixed rod is provided with a reinforcing block.

6. The ladder according to claim 1, wherein the fixed rod is perpendicular to the positioning connecting rod.

7. The ladder according to claim 1, wherein the positioning connecting rod extends along a width direction of the main body.

8. The ladder according to claim 1, wherein the positioning plate comprises a plate body and at least one rotating plate rotatably connected to one end of the plate body, and the positioning connecting rod is connected to the plate body.

9. The ladder according to claim 1, wherein the positioning plate further includes a spacer located on a surface of the positioning plate that is opposite to a surface to which the positioning connecting rod is attached.

10. The ladder according to claim 1, wherein the positioning connecting rod is connected to at least one of the plurality of crossmembers.

11. The chair according to claim 1, wherein the main body of the ladder is a straight ladder or a telescopic ladder.

12. The ladder according to claim 1, wherein the ladder further comprises a support structure, the support structure includes a pair of support legs with each support leg respectively connected to one side of a lower portion of the main body.

13. The ladder according to claim 12, wherein each of the supporting legs comprises:

a first leg and a second leg;

a first end of the first leg rotatably connected with the main body of the ladder and a second end of the first leg slidably connected to the second leg; and a first end of the second leg rotatably connected with the main body.

14. The ladder according to claim 13, wherein the second end of the first leg may slide in a direction of a length of the second leg.

15. The ladder according to claim 12, wherein the support structure further comprises a support connecting rod extending between each of the support legs.

16. The ladder according to claim 12, wherein each of the support legs are respectively connected to the elongated support members.

* * * * *